United States Patent
Yang et al.

(10) Patent No.: US 8,731,467 B2
(45) Date of Patent: May 20, 2014

(54) PLAYING CONTROL METHOD, SYSTEM AND DEVICE FOR BLUETOOTH MEDIA

(75) Inventors: Xin Yang, Guangdong Province (CN); Zhiping Zhang, Guangdong Province (CN); Qihong Fu, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 78 days.

(21) Appl. No.: 13/380,617

(22) PCT Filed: May 25, 2010

(86) PCT No.: PCT/CN2010/073227
§ 371 (c)(1),
(2), (4) Date: Dec. 23, 2011

(87) PCT Pub. No.: WO2010/148885
PCT Pub. Date: Dec. 29, 2010

(65) Prior Publication Data
US 2012/0302171 A1 Nov. 29, 2012

(30) Foreign Application Priority Data
Dec. 14, 2009 (CN) .......................... 2009 1 0246971

(51) Int. Cl.
*H04B 5/00* (2006.01)
*G01R 31/08* (2006.01)
*G06F 15/16* (2006.01)

(52) U.S. Cl.
USPC .......................... 455/41.1; 370/235; 709/232

(58) Field of Classification Search
USPC ................ 455/41.1–41.3; 709/227, 231–232; 370/235, 468, 352, 338
See application file for complete search history.

(56) References Cited

U.S. PATENT DOCUMENTS

| | | | |
|---|---|---|---|
| 2002/0031144 A1* | 3/2002 | Barton | 370/468 |
| 2003/0005139 A1* | 1/2003 | Colville et al. | 709/231 |
| 2003/0236907 A1* | 12/2003 | Stewart et al. | 709/231 |
| 2004/0071088 A1* | 4/2004 | Curcio et al. | 370/235 |
| 2004/0221044 A1* | 11/2004 | Rosenbloom et al. | 709/227 |
| 2004/0230655 A1* | 11/2004 | Li et al. | 709/205 |
| 2005/0069283 A1 | 3/2005 | Mitsuyu | |
| 2007/0005795 A1* | 1/2007 | Gonzalez | 709/232 |
| 2007/0136488 A1* | 6/2007 | Cho et al. | 709/231 |
| 2010/0138478 A1* | 6/2010 | Meng | 709/203 |

OTHER PUBLICATIONS

Bluetooth Specification dated Jun. 26, 2008.*
Bluetooth Audio Video WG Audio/Video Remote Control Profile Jun. 26, 2008.

* cited by examiner

*Primary Examiner* — Andrew Wendell
*Assistant Examiner* — Cindy Trandai
(74) *Attorney, Agent, or Firm* — Ling Wu; Stephen Yang; Ling and Yang Intellectual Property

(57) ABSTRACT

This present invention discloses a method, system and device for a play control of a Bluetooth media. The method includes: sending a JumpTo media play control command to a Bluetooth play device through an extended protocol message by a Bluetooth control device; performing the play control on a played media according to the JumpTo media play control command by the Bluetooth play device. In the present invention, the extension is performed on the protocol reserved manufacturer custom field, which enables the Bluetooth control device to send the extended media play control command in the protocol architecture to the Bluetooth play device, thereby implementing the accurate locating play control for a played media file.

12 Claims, 1 Drawing Sheet

PLAYING CONTROL METHOD, SYSTEM AND DEVICE FOR BLUETOOTH MEDIA

TECHNICAL FIELD

The present invention relates to a field of Bluetooth wireless communication, and in particular, to a method for a play control of a Bluetooth media and a system and device thereof.

BACKGROUND OF THE RELATED ART

Bluetooth technology is an open standard of wireless data and voice transmission, mainly used for solving a wireless communication problem in a short distance. Its effective communication distance is commonly within 10 meters. The Bluetooth protocol standard is established and issued by the Bluetooth special interest group (SIG).

According to various application modes of the Bluetooth, various profiles are defined in the standard. Wherein, in order to expediently implement the control for the played media through the Bluetooth control device when listening in stereo music or watching video media on the Bluetooth media output device, the standard specifies the audio video remote control profile (AVRCP). The common media play control instructions are defined in the AVRCP, including: Play, Stop, Pause, Forward, Backward, etc.

At present, the multimedia player already enters in the digital age and the multimedia data sources for playing are mainly digital files rather than the audiotapes, videotapes, etc. of analog format in the early years. The present media player also provides more, much powerful, much convenient control operation instructions to implement much better audio-visual enjoyment. While there is no corresponding operation command word (Operation_id) defined in the AVCRP, such as jumping to somewhere to start play, etc. So that the powerful control functions which are provided with the media player itself cannot be achieved through the present Bluetooth control device.

SUMMARY OF THE INVENTION

The technical problem that the present invention will solve is to provide a method, system and device for a play control of a Bluetooth media, and an accurate locating play control is implemented for a multimedia file through an extended message command.

To solve the above problem, the present invention provides a method for a play control of a Bluetooth media, comprising:

sending a JumpTo media play control command to a Bluetooth play device through an extended protocol message by a Bluetooth control device; and performing the play control for a played media according to the JumpTo media play control command by the Bluetooth play device.

A trigger condition of sending the JumpTo media play control command by the Bluetooth control device includes:

inputting a time which is required to jump to play on the Bluetooth control device; or, sliding a process bar on the Bluetooth control device to a time which is required to jump to play.

The extended protocol message is an extended instruction, a manufacturer custom operation Vendor Unique, of a PASS THROUGH which is based on a protocol standard, a filling action in the extended instruction is defined as JumpTo, and a carried time parameter is the time to jump to play.

The step of performing the play control for the played media according to the JumpTo media play control command by the Bluetooth play device comprises:

a Bluetooth controlled terminal, after receiving the JumpTo media play control command, analyzing the JumpTo media play control command and the time parameter carried by the JumpTo media play control command, and sending the analyzed time parameter directly to a media player, or directly calling an application programming interface of the media player with the time parameter acting as an input parameter; and the media player, from the time specified by the time parameter, sending media data to a Bluetooth media output module to implement the JumpTo play control for the played media.

The method further comprises:

checking validity of the time parameter and performing the step of sending the media data to the Bluetooth media output module only if the time parameter is valid by the media player.

The present invention further provides a system for a play control of a Bluetooth media, comprising a Bluetooth control device and a Bluetooth play device, wherein, the Bluetooth control device is configured to send a JumpTo media play control command to the Bluetooth play device through an extended protocol message; and the Bluetooth play device is configured to perform the play control for a played media according to the JumpTo media play control command.

The Bluetooth control device comprises a Bluetooth master control terminal and the Bluetooth master control terminal is configured to send the JumpTo media play control command if a following trigger condition is satisfied:

inputting a time which is required to jump to play on the Bluetooth control device; or, sliding a process bar on the Bluetooth control device to a time which is required to jump to play.

Further, the Bluetooth play device comprises a Bluetooth controlled terminal, a media player and a Bluetooth media output module, wherein, the Bluetooth controlled terminal is configured to, after receiving the JumpTo media play control command sent by the Bluetooth master control terminal, analyze the JumpTo media play control command and a time parameter carried by the JumpTo media play control command, and send the analyzed time parameter directly to the media player, or directly call an application programming interface of the media player with the time parameter acting as an input parameter; and the media player is configured to, from the time specified by the time parameter, send media data to the Bluetooth media output module to implement the JumpTo play control for the played media.

The media player further comprises a checking module, the checking module is configured to check validity of the time parameter and send the media data to the Bluetooth media output module only if the time parameter is valid.

The extended protocol message is an extended instruction, a manufacturer custom operation, of a PASS THROUGH which is based on a protocol standard, a filling action in the extended instruction is defined as JumpTo, and a carried time parameter is the time to jump to play.

The Bluetooth media output module is configured to send the media data to the Bluetooth control device; and the Bluetooth control device further comprises a Bluetooth media display module and the Bluetooth media display module is configured to receive the media data sent by the Bluetooth media output module, and complete the display of the multimedia.

The present invention further provides a Bluetooth control device, comprising a Bluetooth master control terminal, wherein, the Bluetooth master control terminal is configured to send a JumpTo media play control command to a Bluetooth play device through an extended protocol message.

The Bluetooth master control terminal is configured to send the JumpTo media play control command if a following trigger condition is satisfied:

inputting a time which is required to jump to play on the Bluetooth control device; or, sliding a process bar on the Bluetooth control device to a time which is required to jump to play.

The extended protocol message is an extended instruction, a manufacturer custom operation, of a PASS THROUGH which is based on a protocol standard, a filling action in the extended instruction is defined as JumpTo, and a carried time parameter is the time to jump to play.

The device further comprises a Bluetooth media display module, and the Bluetooth media display module is configured to receive the media data sent by the Bluetooth play device, and complete the display of the multimedia.

An accurate play control can be performed for the Bluetooth play device as required through the technical scheme of the present invention.

PREFERRED EMBODIMENTS OF THE PRESENT INVENTION

The core idea of the present invention is: on a Bluetooth control device (such as a Bluetooth multimedia output device), the extension is performed for the manufacturer custom field reserved in protocol based on the protocol standard, which enables the Bluetooth control device to send the media play control command extended in the protocol architecture to the Bluetooth play device, such as the JumpTo signaling used for implementing the accurate locating play control, etc. Thereby the Bluetooth wireless remote control media player can implement the accurate locating play control for the multimedia file, and the powerful control function provided with the media player itself can be implemented.

Based on the above idea, the play control method of the media player provided by the present invention adopts below technical scheme:

A Bluetooth control device sends a JumpTo media play control command to a Bluetooth play device through an extended protocol message;

The Bluetooth play device performs a play control for a played media according to the media play control command.

Further, a trigger condition of the JumpTo media play control command includes:

inputting a time which is required to jump to play on the Bluetooth control device; or, sliding a process bar on the Bluetooth control device to a time which is required to jump to play.

Further, the extended protocol message is an extended instruction Vendor Unique id (a manufacturer custom operation) of a PASS THROUGH which is based on a protocol standard. The filling action in the extended instruction is defined as JumpTo, and the carried time parameter is the time to jump to play.

Figure 1:
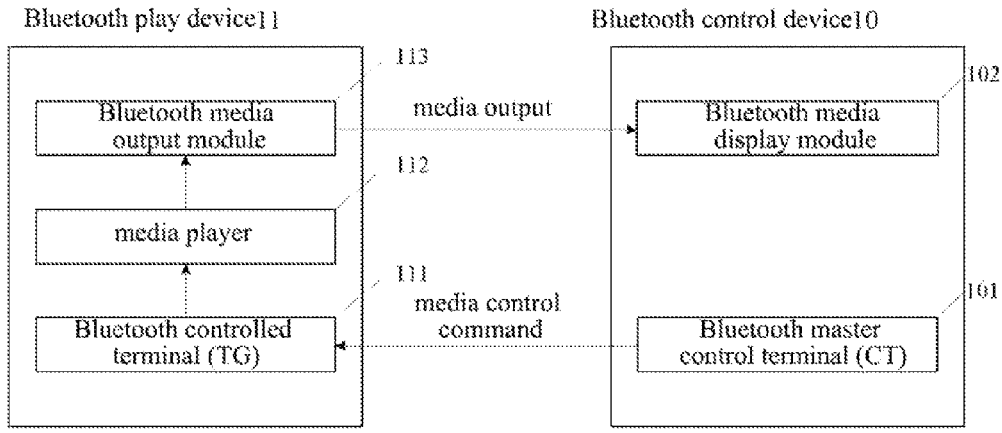
FIG. 1 is a schematic block diagram of a play control system of a Bluetooth media in the present invention.

As shown in FIG. 1, the present invention provides a play control system of a Bluetooth media, including: a Bluetooth control device 10 and a Bluetooth play device 11. Wherein, the Bluetooth control device 10 is used for sending a JumpTo media play control command to the Bluetooth play device through an extended protocol message;

the Bluetooth play device 11 is used for performing the play control for a played media according to the JumpTo media play control command.

Further, the Bluetooth control device 10 includes a Bluetooth master control terminal 101 (whose role is a controller, CT for short, usually being a onboard Bluetooth device, a handheld display device with a Bluetooth function, etc.) and a Bluetooth media display module 102. The Bluetooth play device includes a Bluetooth controlled terminal 111 (whose role is a target, TG for short, usually being a cell phone, a computer with the Bluetooth function, an audio and video play device, etc.), a media player 112 and a Bluetooth media output module 113.

The Bluetooth controlled terminal 111, after receiving the media play control command sent by the Bluetooth master control terminal 101, analyzes the control command and the time parameter carried therein, and sends the analyzed time parameter directly to the media player. Or the time parameter is taken as an input parameter to directly call an application programming interface (API) which the media player already has;

The media player 112, from the time specified by the time parameter according to the time parameter, sends media data to the Bluetooth media output module 113 to implement the play control for the played media, and returns the operation result to the Bluetooth controlled terminal 111. The Bluetooth controlled terminal 111 returns a VendorUniqueResponse (a manufacturer custom operation response message) to the Bluetooth mater control terminal 101;

Further, the Bluetooth media output module 113 is used for sending media streaming data to the Bluetooth media display module 102 of the Bluetooth control device 10;

The Bluetooth media display module 102 is used for receiving the media streaming data sent by the Bluetooth media output module 113 and completing the display of the multimedia.

Figure 2:
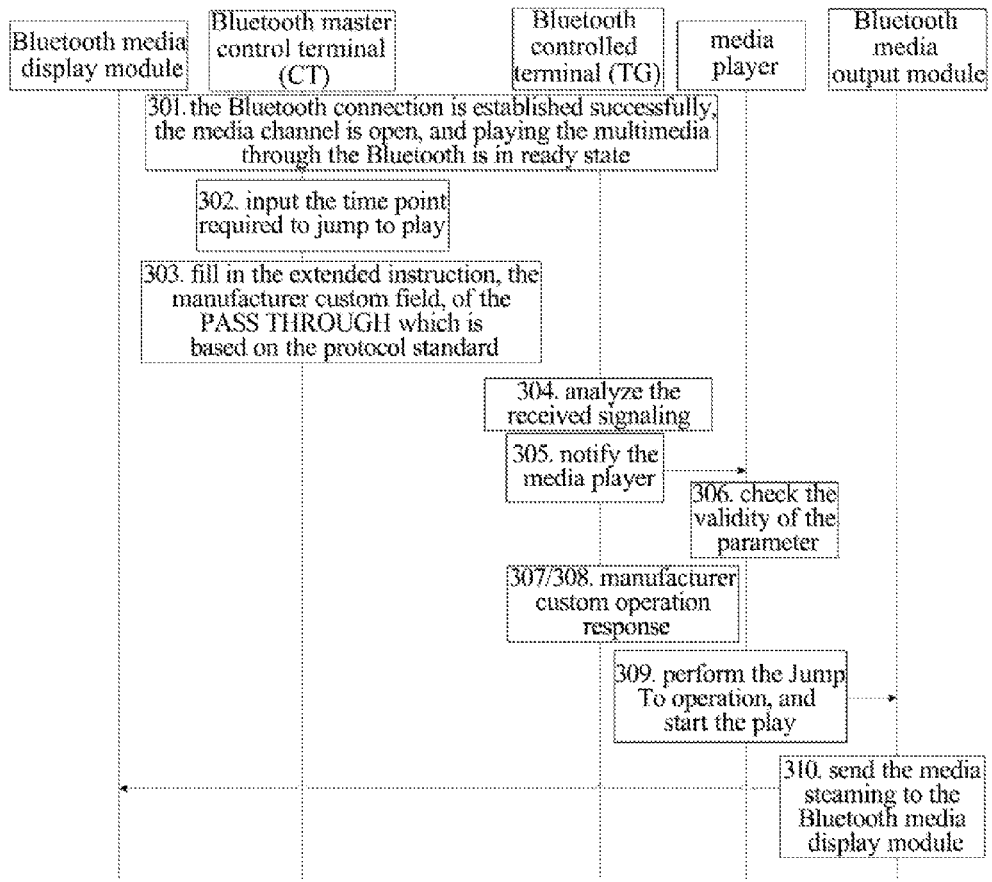
FIG. 2 is a flow chart of a method for implementing accurate play control for a Bluetooth media according to an embodiment of the present invention

Below taking the JumpTo media play control command as an example, the implementing of the technical of the present invention is further illustrated in details. As shown in FIG. 2, the play control flow of the media player according to an embodiment of the present invention mainly includes following steps:

Step 301, as a precondition, the Bluetooth connection between the Bluetooth multimedia output device and the Bluetooth multimedia play device is established successfully, the media channel is open, and playing the multimedia through the Bluetooth is in ready state;

Step 302, performing the operation on the CT, the time point required to jump to play is input, or the process bar is directly slid to the time point required to jump to play, requiring to perform the "jump to . . . to play" operation;

Step 303, the CT sends out the extended instruction Vendor Unique (the manufacturer custom field) of the PASS THROUGH which is based on the protocol standard through the Bluetooth AVRCP profile. The filling action in the extended instruction is defined as JumpTo. A reserved field therein is set as JumpTo. For example, the filed Vendor_U- nique_id can be set as a preset value, representing JumpTo. The preset value can be, but is not limited to, 0x01. When reading the field, the multimedia play device knows that the field represents the JumpTo instruction, and then it performs the JumpTo. The carried parameter is the above time point input by a user, using but not limited to 0x00 to represent the time parameter of JumpTo in the extended instruction. Wherein, the 3 time parameters, hour, minute and second, are stored in the $10^{th}$ to $12^{th}$ bytes respectively. The filling form of the extended instruction is as table 1;

Step 304, the TG receives the JumpTo signaling from the CT, and analyzes the JumpTo signaling and the carried time parameter;

Step 305, the TG sends the corresponding message to the media player according to the JumpTo signaling, or calls the corresponding media player API functions;

Step 306, the media player checks the parameter validity. For example, the checking for the parameter validity can be implemented through a checking module in the media player. Step 307 is processed if the parameter is invalid; while step 308 is processed if the parameter is valid;

Step 307, the media player returns operation performing failure to the TG. After receiving the performing result, the TG sends out the extended instruction VendorUniqueResponse (the manufacturer custom operation response) of the PASS THROUGH which is based on the protocol standard to the CT. The filling form of the extended instruction is as table 2, wherein the Response field is filled as 0xA (REJECTED), and the whole flow ends;

Step 308, the media player performs the JumpTo operation successfully, and returns an operation performing success result to the TG. The TG sends out the extended instruction VendorUniqueResponse of the PASS THROUGH which is based on the protocol standard to the CT. The filling form of the extended instruction is as table 2, wherein the Response field is filled as 0x9 (ACCEPTED);

Step 309, the media player sends the media data to the Bluetooth media output module from the specified time point;

Step 310, the Bluetooth media output module sends the media steaming data to the Bluetooth media display module of the Bluetooth multimedia output device through the Bluetooth, completes the multimedia display on the Bluetooth multimedia output device, and finishes the whole locating play flow.

Table 1 is a protocol data unit (PDU) according to an embodiment of the present invention. The PDU is a data frame structure defined in the normalized file by the Bluetooth standard, representing the manufacturer custom operation VendorUnique data frame.

TABLE 1

| | | | | | | | | |
|---|---|---|---|---|---|---|---|---|
| Oct | MSB (7) | 6 | 5 | 4 | 3 | 2 | 1 | LSB (0) |
| 0 | 0x0 | | | | | | Ctype: 0x0 (CONTROL) | |
| 1 | Subunit_type: 0x9 (PANEL) | | | | | | Subunit_ID: 0x0 | |
| 2 | Opcode: 0x7C (PASS THROUGH) | | | | | | | |
| 3 | State_flag* | | Operation_ID: 0x7E (VENDOR UNIQUE) | | | | | |
| 4 | Operation_data_field_length: 0x8 | | | | | | | |
| 5-7 | Company ID: BT SIG registered CompanyID | | | | | | | |
| 8-9 | Vendor_unique_id: 0x01 | | | | | | | |
| 10 | Hour: 0x00 | | | | | | | |
| 11 | Minute: 0x00 | | | | | | | |
| 12 | Second: 0x00 | | | | | | | |

Wherein, the byte 0 to the byte 7 are all from normalized definition, which can be filled in according to the actual situation;

The byte 8 to the byte 9 are the reserved manufacturer custom field operation word Vendor_unique_id in the standard. Its extension definition is defined in the embodiment of the present invention: when the value of the field is 0x01, it represents "jump to . . . to play", the JumpTo operation. Certainly the value of the Vendor_unique_id can be any value, as long as it represents the JumpTo control instruction when presetting the value.

The byte 10 to the byte 12 are used for representing the play time of jumping to the multimedia file, and the hour, minute and second are stored in the 3 bytes respectively.

Table 2 is a protocol data unit (PDU) according to an embodiment of the present invention. The PDU is a data frame structure defined in the normalized file by the Bluetooth standard, representing the manufacturer custom operation response VendorUniqueResponse data frame.

TABLE 2

| | | | | | | | | |
|---|---|---|---|---|---|---|---|---|
| Oct | MSB (7) | 6 | 5 | 4 | 3 | 2 | 1 | LSB (0) |
| 0 | 0x0 | | | | | | Response* | |
| 1 | Subunit_type: 0x9 (PANEL) | | | | | | Subunit_ID: 0x0 | |
| 2 | Opcode: 0x7C (PASS THROUGH) | | | | | | | |
| 3 | State_flag** | | Operation_ID: 0x7E (VENDOR UNIQUE) | | | | | |
| 4 | Operation_data_field_length: 0x5 | | | | | | | |
| 5-7 | Company ID: BT SIG registered CompanyID | | | | | | | |
| 8-9 | Vendor_unique_id: 0x01 | | | | | | | |

Wherein, the byte 0 to the byte 7 are all from normalized definition, which can be filled in according to the actual situation;

The byte 8 to the byte 9 are the reserved manufacturer custom field operation word Vendor_unique_id in the standard. Its extension definition is defined in the embodiment of the present invention: when the value of the field is 0x01, it represents the response to the operation "jump to . . . to play", the JumpTo operation. Also certainly the value of the Vendor_unique_id can be any value, as long as it represents the JumpTo control instruction when presetting the value.

The above description is only the preferred embodiments of the present invention and is not intended to limit the scope of the present invention. The present invention can have a variety of other embodiments. Those skilled in the art can make the corresponding modifications and variations according to technical scheme and the conception of the present invention without departing from the spirit and essence of the present invention. And all of these modifications or the variations should be embodied in the scope of the appending claims of the present invention.

INDUSTRIAL APPLICABILITY

The accurate play control can be performed as required for the Bluetooth play device through the technical scheme of the present invention.

What we claim is:

1. A method for a play control of a Bluetooth media, comprising:
    sending, by a Bluetooth control device, a JumpTo media play control command to a Bluetooth play device through an extended protocol message; wherein said extended protocol message is an extended instruction, Vendor Unique, of a PASS THROUGH defined by the Bluetooth protocol standard, an action defined in said extended instruction is the JumpTo media play control command with a time parameter specifying a time position in a media play time frame to be jumped to; and controlling, by the Bluetooth play device, the Bluetooth media to be played from the time position specified in the time parameter of a received JumpTo media play control command.

2. The method according to claim 1, wherein, a trigger condition of sending, by a Bluetooth control device, the JumpTo media play control command comprises:

inputting on the Bluetooth control device a time which is required to jump to for the Bluetooth media to be played; or, sliding a process bar on the Bluetooth control device to the time which is required to jump to for the Bluetooth media to be played.

3. The method according to claim 1, wherein, the step of controlling, by the Bluetooth play device, the Bluetooth media to be played from the time position specified in the time parameter of the received JumpTo media play control command comprises:

a Bluetooth controlled terminal of the Bluetooth play device, after receiving the JumpTo media play control command, analyzing the JumpTo media play control command and the time parameter carried by the JumpTo media play control command and sending the analyzed time position specified in the time parameter directly to a media player of the Bluetooth play device, or directly calling an application programming interface of the media player of the Bluetooth play device with the time position specified in the time parameter acting as an input parameter; and the media player, from the time position specified in the time parameter, sending media data to a Bluetooth media output module of the Bluetooth play device to implement the JumpTo play control for the Bluetooth media.

4. The method according to claim 3, further comprising:

the media player checking validity of the time parameter and performing the sending the media data to the Bluetooth media output module only if the time parameter is valid.

5. A system for a play control of a Bluetooth media, comprising a Bluetooth control device and a Bluetooth play device, wherein, the Bluetooth control device is configured to send a JumpTo media play control command to the Bluetooth play device through an extended protocol message; wherein said extended protocol message is an extended instruction, Vendor Unique, of a PASS THROUGH defined by the Bluetooth protocol standard, an action defined in said extended instruction is the JumpTo media play control command with a time parameter specifying a time position in a media play time frame to be jumped to;

the Bluetooth play device is configured to control the Bluetooth media to be played from the time position specified in the time parameter of the received JumpTo media play control command.

6. The system according to claim 5, wherein, the Bluetooth control device comprises a Bluetooth master control terminal, and the Bluetooth master control terminal is configured to send the JumpTo media play control command when a following trigger condition is satisfied:

inputting on the Bluetooth control device a time which is required to jump to for the Bluetooth media to be played; or, sliding a process bar on the Bluetooth control device to the time which is required to jump to for the Bluetooth media to be played.

7. The system according to claim 6, wherein, the Bluetooth play device comprises a Bluetooth controlled terminal, a media player and a Bluetooth media output module;

the Bluetooth controlled terminal is configured to, after receiving the JumpTo media play control command sent by a Bluetooth master control terminal, analyze the JumpTo media play control command and the time parameter carried by the JumpTo media play control command and send the analyzed time position specified in the time parameter directly to the media player, or directly call an application programming interface of the media player with the time position specified in the time parameter acting as an input parameter; and the media player is configured to, from the time position specified in the time parameter, send media data to the Bluetooth media output module to implement the JumpTo play control for the Bluetooth media.

8. The system according to claim 7, wherein, the media player comprises a checking module, the checking module is configured to check validity of the time parameter and send the media data to the Bluetooth media output module only if the time parameter is valid.

9. The system according to claim 7, wherein, the Bluetooth media output module is configured to send the media data to the Bluetooth control device;

the Bluetooth control device further comprises a Bluetooth media display module, and the Bluetooth media display module is configured to receive the media data sent by the Bluetooth media output module, and complete a display of multimedia.

10. A Bluetooth control device, comprising a Bluetooth master control terminal, wherein, the Bluetooth master control terminal is configured to send a JumpTo media play control command to a Bluetooth play device through an extended protocol message; wherein said extended protocol message is an extended instruction, Vendor Unique, of a PASS THROUGH defined by the Bluetooth protocol standard, an action defined in said extended instruction is the JumpTo media play control command with a time parameter specifying a time position in a media play time frame to be jumped to;

so that the Bluetooth play device controls a Bluetooth media to be played from the time position specified in the time parameter of the received JumpTo media play control command.

11. The device according to claim 10, wherein, the Bluetooth master control terminal is configured to send the JumpTo media play control command when a following trigger condition is satisfied:

inputting on the Bluetooth control device a time which is required to jump to for the Bluetooth media to be played; or, sliding a process bar on the Bluetooth control device to the time which is required to jump to for the Bluetooth media to be played.

12. The device according to claim 10, further comprising a Bluetooth media display module, wherein the Bluetooth media display module is configured to receive media data sent by the Bluetooth play device, and complete a display of multimedia.

* * * * *